Oct. 20, 1959  H. S. VAN BUREN, JR  2,909,352
FASTENING DEVICE
Filed Jan. 10, 1957

INVENTOR:
HAROLD S. VAN BUREN JR,
BY Robert E Ross
ATTORNEY.

United States Patent Office 2,909,352
Patented Oct. 20, 1959

2,909,352

FASTENING DEVICE

Harold S. van Buren, Jr., Cambridge, Mass., assignor to United-Carr Fastener Corporation, Boston, Mass., a corporation of Delaware Application January 10, 1957, Serial No. 633,485

2 Claims. (Cl. 248—239)

This invention relates generally to fastening devices, and has particular reference to a fastener for attachment to a supporting panel having an aperture therein.

In the assembly of articles incorporating sheet metal panels, such as refrigerators, automobiles, and the like, it is frequently necessary to attach devices to the panel at various points in the assembly operation where there is no convenient access to the rear of the panel. In other types of assembly operations, although the rear of the panel may be reached conveniently at the time when the fastener is assembled, at some later point in the assembly operation, when access to the rear of the panel is no longer possible, it sometimes becomes necessary, for various reasons, to remove the fastener and replace it.

The object of this invention is to provide a fastener for blind assembly into a supporting panel opening, which is capable of being removed from the opening without damage to either the fastener or the panel.

A further object of this invention is to provide a fastener for attachment into a supporting member in which a spring member is molded integral with a stud projecting from the end thereof to lock into engagement with the panel.

A further object of this invention is to provide a fastener for attachment into a supporting panel opening, in which the fastener is well suited for adjusting to variations in panel thicknesses.

Another object of this invention is to provide a fastener for attachment into a supporting panel in which the more strain is put upon the stud member, the tighter it adheres to the panel.

A further object of this invention is to provide a fastener for attachment into a supporting panel in which the fastener makes contact with the panel on a relative large surface to reduce cracking of any porcelainized surface of the panel to a minimum.

Other objects of the invention will, in part, be obvious, and will, in part, appear hereinafter.

Figure 1:
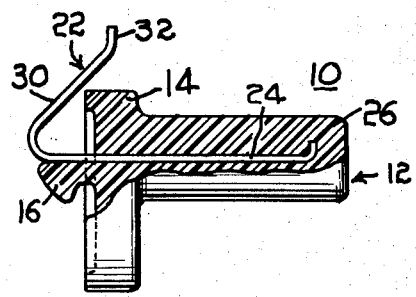
Fig. 1 is a view of the fastener as seen from the front.
Figure 2:
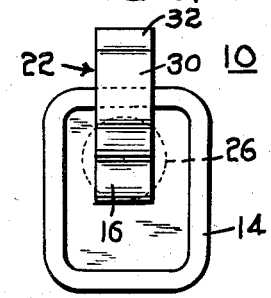
Fig. 2 is a view of the fastener of Fig. 1 as seen from the left.
Figure 3:
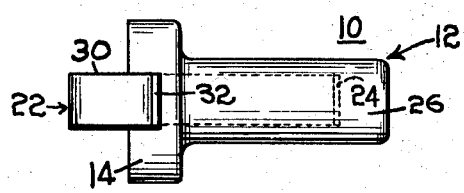
Fig. 3 is a plan view of the fastener.

Referring to the drawing, there is illustrated a fastener 10 which comprises a supporting member 12, base portion 14, a grooved projection 16 adapted for engaging the wall of the aperture 18 in a panel 20 of a refrigerator or the like, and a resilient sheet metal spring member 22.

Figure 5:
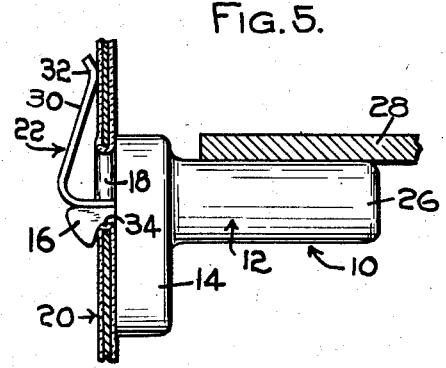
Fig. 5 is a view of the fastener of Fig. 4, completely assembled into the application panel, showing part of a shelf resting on the supporting member.

The supporting member 12, in the illustrated embodiment, is formed of a single piece of molded plastic such as styrene, cellulose acetate, ethyl cellulose or the like with a portion 24 of the sheet metal spring member 22 molded integrally within the body. The supporting member 12 extending substantially perpendicular to the base portion 14 is provided with a shelf support 26 at one end thereof and is depicted in Fig. 5 having a shelf 28 resting thereon. The base 14 has a grooved projection 16 molded integral with it and extending substantially perpendicular thereto, and extending in a direction generally opposite to the shelf support 26.

The free portion 30 of the spring member 22 extends out of the base 14 a distance equal to that of the projection in a direction opposite to the shelf support 26 and above the grooved projection 16, curving in an upwardly direction and back beyond the base portion 14 terminating in a free end portion 32 for bearing against the inner wall of the panel 20.

To assemble the supporting member 12 into the panel opening 18, the fastener 10 is tilted so that the free end 32 of the spring member 22 may be inserted into the opening 18 until the upper portion of the base 14 rests against the wall of the panel 20. Pressure is then applied to the lower portion of the base 14 to overcome pressure exerted by the spring member against the inside of the panel until the base rests flush against the exterior of the panel 20. The groove in the projection 16 is disposed vertically above the wall of the aperture 18, and when the fastener is forced downwardly, the grooved projection 16 enters into engagement with the wall of the aperture 18, locking the fastener securely in position. The more pressure that is placed upon the supporting member 12, the more tightly the grooved projection 16 engages the wall of the aperture 18 of the panel 20, and thereby secures the fastener more firmly in position.

Figure 6:
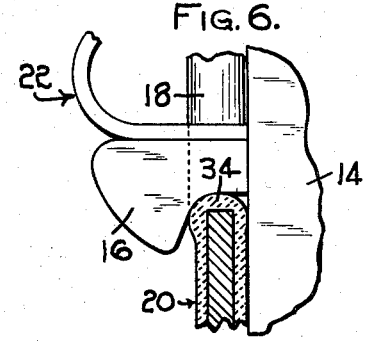
Fig. 6 is an enlarged view of a portion of Fig. 5.
Figure 4:
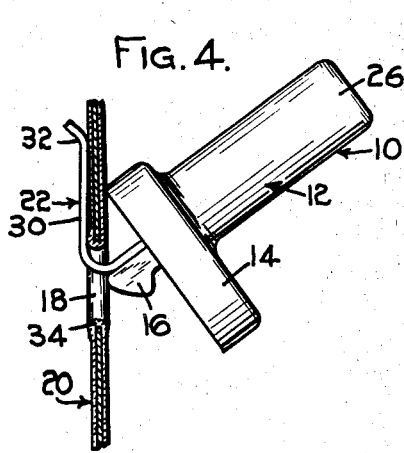
Fig. 4 is a view of the fastener as seen from the front partly assembled into the application panel.

The resilient characteristics of the spring member 22 allow the fastener to adapt itself for variations in plate thickness. Furthermore, the rounded porcelain edges 34 of the aperture 18 as shown in Fig. 6 are protected from cracking by having a curve-to-curve surface contact with the curved edge of the projection 16.

Since certain obvious modifications may be made in the device without departing from the scope of the invention, it is intended that all matter contained herein be interpreted in an illustrative and not in a limiting sense.

I claim:

1. A shelf support and the like comprising an elongated shelf supporting body member, one end of said body member having a face portion for engagement with one face of a panel, a rigid projection extending from the face portion of said body member in axial alignment with the body member for passage through an aperture in the panel, said projection being provided with a transversely extending groove forming a shoulder portion spaced from the face portion of said body member for engaging the opposite face of the panel, and a resilient spring member extending from the face portion of the body member in the same direction as said projection for passage through the aperture in the panel, said spring member including a reverse bend portion extending in a direction opposite to that of said groove in said projection and back in the direction of said body member with the free end thereof terminating, when the shelf support is in an unassembled state, at a point beyond the face portion of said body member whereby when the shelf support is inserted in the aperture of the panel by a tipping action only of the shelf supporting body member relative to the panel and a final lateral movement of the shelf supporting body member relative to the panel, the shoulder portion of said transversely extending groove and the free end portion of said spring member will engage with that face of the panel opposite the face in engagement with the face portion of said body member.

2. A shelf support and the like comprising a base member having a face portion on one side thereof for engagement with one face of a panel comprising an elongated shelf supporting integral body member extending from said base member from the opposite the flat face side, a rigid integral projection extending from the face portion of said base member in axial alignment with the body member for passage through an aperture in the panel, said projection being provided with a transversely extending groove forming a shoulder portion spaced from the face portion of said body member for engaging the opposite face of the panel, and a resilient spring metal member extending from the face portion of the base member in the same direction as said projection for passage through the aperture in the panel, said spring member including a reverse bend portion extending in a direction opposite to that of said groove in said projection and back in the direction of said base member with the free end thereof terminating, when the shelf support is in an unassembled state, at a point beyond the face portion of said base member whereby when the shelf support is inserted in the aperture of the panel by a tipping action only of the base member and the shelf supporting body member relative to the panel and a final lateral movement of the base member and the shelf supporting body member relative to the panel, the shoulder portion of said transversely extending groove and the free end portion of said spring member will engage with that face of the panel opposite the face engagement with the face portion of said base member.

References Cited in the file of this patent
UNITED STATES PATENTS

| | | |
|---|---|---|
| 1,634,884 | Peer | July 5, 1927 |
| 1,676,707 | Peer | July 10, 1928 |
| 2,179,604 | Tinnerman | Nov. 14, 1939 |
| 2,450,306 | Sickles | Sept. 28, 1948 |
| 2,618,033 | Tinnerman et al. | Nov. 18, 1952 |